(12) United States Patent
Spivey et al.

(10) Patent No.: US 8,401,385 B2
(45) Date of Patent: Mar. 19, 2013

(54) OPTICALLY SWITCHED COMMUNICATION NETWORK

(75) Inventors: Brett Spivey, Carlsbad, CA (US); Eric Korevaar, La Jolla, CA (US); Hus Tigli, La Jolla, CA (US); Todd Barrett, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 12/653,723

(22) Filed: Dec. 17, 2009

(65) Prior Publication Data

US 2012/0237217 A1 Sep. 20, 2012

Related U.S. Application Data

(63) Continuation-in-part of application No. 10/677,590, filed on Oct. 2, 2003, now abandoned.

(51) Int. Cl.
*H04J 14/02* (2006.01)
(52) U.S. Cl. .................. 398/48; 398/57; 398/68
(58) Field of Classification Search .......... 398/48–52, 398/57, 68–72
See application file for complete search history.

(56) References Cited

U.S. PATENT DOCUMENTS

| | | | | |
|---|---|---|---|---|
| 7,058,296 B2 * | 6/2006 | Saniee et al. | ...................... | 398/3 |
| 7,088,921 B1 * | 8/2006 | Wood | ............................. | 398/67 |
| 2004/0165889 A1 * | 8/2004 | Mahony et al. | ................. | 398/71 |
| 2004/0208644 A1 * | 10/2004 | Sirat et al. | ..................... | 398/186 |
| 2004/0246896 A1 * | 12/2004 | Hoang et al. | .................. | 370/230 |
| 2005/0071484 A1 * | 3/2005 | Kang et al. | .................... | 709/230 |

OTHER PUBLICATIONS

Yamada et al, "106 Channel X 10 Gbit/s, 640 Km DWDM with 25 Ghz spacing with supercontinuum Multi-U carrier source", Electronics Letters, vol. 37, No. 25; Dec. 6, 2001.*

* cited by examiner

*Primary Examiner* — Leslie Pascal
(74) *Attorney, Agent, or Firm* — John R. Ross

(57) ABSTRACT

A large communication network suitable for nationwide or worldwide utilization. The present invention overthrows the conventional packet switching technologies with an all-optical network. The invention uses tunable laser sources to generate large number of highly stable narrow-band optical signals, each serving as a communication channel. With packet processing replaced by all-optical channels, the network become highly secure and scalable while harnessing the virtually unlimited capacity of fiber-optic. A large number of nodes (called area code nodes) are connected with all-fiber-optic links with all-optical switches. A routing algorithm provides one or more communication links from each area code node to every other area code node so that information never has to change carrier wavelength as it travels the network. Each area code node contains circuits that are provided to connect individual users to the network.

16 Claims, 15 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 0 | 4 | 1 | 6 | 19 | 11 | 3 | 2 | 5 | 10 | 14 | 17 | 9 | 15 | 12 | 18 | 16 | 17 | 18 | 19 |
| 1 | 0 | 1 | 2 | 4 | 5 | 7 | 3 | 6 | 8 | 9 | 10 | 12 | 14 | 17 | 11 | 16 | 13 | 7 | 16 | 8 |
| 2 | 1 | 0 | 2 | 5 | 9 | 15 | 12 | 11 | 7 | 16 | 18 | 4 | 17 | 6 | 19 | 14 | 19 | 13 | 15 | 18 |
| 3 | 0 | 1 | 2 | 3 | 4 | 5 | 6 | 7 | 8 | 9 | 10 | 12 | 14 | 17 | 19 | 11 | 3 | 10 | 8 | 13 |
| 4 | 0 | 1 | 2 | 10 | 7 | 6 | 14 | 2 | 9 | 19 | 15 | 11 | 13 | 17 | 18 | 4 | 13 | 16 | 15 | 18 |
| 5 | 0 | 1 | 2 | 3 | 4 | 5 | 6 | 7 | 8 | 9 | 10 | 12 | 13 | 15 | 11 | 14 | 8 | 5 | 12 | 16 |
| 6 | 1 | 2 | 0 | 4 | 6 | 8 | 15 | 11 | 9 | 19 | 5 | 14 | 16 | 10 | 3 | 7 | 16 | 18 | 17 | 19 |
| 7 | 0 | 1 | 2 | 3 | 4 | 5 | 6 | 7 | 8 | 12 | 9 | 10 | 17 | 13 | 15 | 18 | 18 | 17 | 12 | 13 |
| 8 | 2 | 1 | 4 | 0 | 10 | 16 | 17 | 14 | 17 | 4 | 5 | 19 | 18 | 14 | 9 | 15 | 11 | 16 | 14 | 19 |
| 9 | 0 | 2 | 2 | 3 | 4 | 5 | 6 | 7 | 10 | 11 | 8 | 9 | 12 | 13 | 17 | 18 | 12 | 7 | 11 | 13 |
| 10 | 2 | 5 | 4 | 1 | 0 | 18 | 17 | 16 | 7 | 17 | 11 | 12 | 6 | 14 | 13 | 16 | 19 | 15 | 14 | 16 |
| 11 | 0 | 1 | 2 | 3 | 4 | 5 | 6 | 7 | 14 | 15 | 10 | 19 | 8 | 13 | 9 | 18 | 15 | 3 | 8 | 12 |
| 12 | 4 | 6 | 5 | 9 | 12 | 0 | 1 | 16 | 8 | 10 | 5 | 10 | 12 | 15 | 17 | 19 | 9 | 11 | 16 | 18 |
| 13 | 0 | 1 | 2 | 3 | 4 | 5 | 6 | 7 | 9 | 15 | 7 | 19 | 11 | 17 | 10 | 13 | 2 | 14 | 18 | 3 |
| 14 | 4 | 7 | 9 | 12 | 14 | 1 | 11 | 5 | 18 | 10 | 11 | 12 | 16 | 18 | 8 | 14 | 17 | 19 | 13 | 15 |
| 15 | 0 | 1 | 2 | 3 | 4 | 5 | 6 | 7 | 9 | 13 | 14 | 12 | 10 | 18 | 8 | 11 | 17 | 0 | 2 | 6 |
|   |   |   |   |   |   |   |   |   |   |   |   |   |   |   |   |   | 16 | 16 | 15 | 19 | assignments₂ =

| | 0 |
|---|---|
| 0 | 0 |
| 1 | 4 |
| 2 | 9 |
| 3 | 11 |
| 4 | 14 |
| 5 | 18 |
| 6 | 23 |
| 7 | 27 |
| 8 | 30 |
| 9 | 34 |
| 10 | 38 |
| 11 | 42 |
| 12 | 46 |
| 13 | 50 |
| 14 | 54 |
| 15 | 58 | assignments₁ =

FIG. 17

OPTICALLY SWITCHED COMMUNICATION NETWORK

This application is a continuation in part of U.S. patent application Ser. No. 10/677,590 filed Oct. 2, 2003 now abandoned. The present invention relates to communication networks and in particular to large optically switched communication networks.

BACKGROUND OF THE INVENTION

High Data Rate Communication

High date rate optical communication systems are well known. The communication industries have developed standards to facilitate interconnectivity among various communication suppliers. One popular standard utilizing time division multiplexing (TDM) to transmit information at high data rates through optical fibers is OC-48/STM-16 which provides data rates at 2.5 Gbps. Other standards at higher data rates are available but OC-192/STM-64 at 10 Gbps represents a current practical upper limit for TDM, with some success at 40 Gbps. Higher data rate can be provided with wavelength multiplexing in which data is multiplexed according to wavelength and time. Modern systems can routinely pack 40 10-Gbps channels through a single fiber for an aggregate bit rate of 400 Gbps. This is referred to as dense wavelength division multiplexing (DWDM).

Dense Wavelength Division Multiplexing

The International Telecommunication Union has established a standardized separation grid calibrated on a krypton spectral line at 193.1 THz (wavelength equal to 1.57 micron) ranging from 186.0 THz to 201.0 THz which provides a total available bandwidth of 15,000 GHz. This bandwidth range is separated into channels which are separated by 100 GHz, although some players squeeze in more channels by providing a separation of only 50 GHz. Separating the 15,000 GHz at 100 GHz spacings would provide 150 channels and at 50 GHz spacings about 300 channels could be provided.

The typical DWDM system includes (1) multiplexers for both time and wavelength for combining signals for transport, (2) demultiplexers for disassembling the aggregate signal so that each signal can be delivered to the appropriate receiver, (3) active or passive switches and/or routers to direct each signal component, (4) filters to provide wavelengths selection and (5) optical add-drop multiplexers which give the service provider the ability to pick up and drop off individual wavelength components at intermediate locations throughout the network. DWDM is important because expanding a network by putting more fiber in the ground costs about $70 K per mile. Adding bandwidth using DWDM costs about one-sixth this amount.

Optical Switching

The principal form of optical switching is nothing more than a sophisticated digital cross-connect system. In the early days of data networking, dedicated facilities were created by manually patching the end points of a circuit at a patch panel, thus creating a complete four-wire circuit. Beginning in the 1980's, digital cross-connect devices such as AT&T's Digital Access and Cross Connect (DACS) became common, replacing the time-consuming, expensive, and error-prone manual process. Most current switches convert signals from incoming optical fiber to electronic signals, switch electronically and then convert the signal back to optical for transmission into the output optical fiber. These switches are referred to as O-E-O switches. The digital cross-connect is a simple switch, designed to established long-term temporary circuits quickly, accurately and inexpensively.

All Optical Switches

Enter the world of optical networking. Traditional cross-connect systems worked fine in the optical domain, provided no problems were happening in the O-E-O conversion process. This, however, was one of the aspects of optical networking that network designers wanted to eradicate from their functional requirements. Thus was born the optical cross-connect switch. The first of these to arrive on the scene was an optical switch provided by Lucent Technologies. The switch was based on a switching technology called the Micro-Electrical Mechanical System (MEMS); the switch was the world's first all-optical cross-connect device.

MEMS relies on micro-mirrors. The mirrors can be configured at various angles to ensure that an incoming optical beam strikes one mirror, reflects off a fixed mirrored surface, strikes another movable mirror, and is then reflected out an egress fiber. These devices are now commercially deployed and offer speed, a relatively small footprint, bit rate and protocol transparency, nonblocking architecture, and highly developed database management. Fundamentally, these devices are very high-speed, high-capacity switches or cross-connect devices.

One of the main difficulties associated with previously proposed all-optical networks is the need for DWDM colors to be changed as they pass through the core switching network. The need comes from traditional switching architectures such as Clos-type to "scramble" or rearrange sub-channels in order to achieve full connectivity.

Packet Switching

The current dominant method for telecommunication and data communication networks is packet switching. Packet switching was designed to optimize available bandwidth by routing bandwidth where it is available. It does not always achieve the desired bandwidth results, but even when it does it does so by sacrificing quality of service and security.

Therefore, the fundamental dilemma in modern telecommunication systems is that wavelengths carry too much information and thus must be packetized to achieve efficiency, but packets are too small to guarantee quality of service and security. This has led to the development of complicated core optical networks and packet edges to the network. The ostensible cost of bandwidth is very low, but when the additional costs associated with high levels of availability through redundancy and high levels of security through encryption, passwords and the like are factored in, the cost of bandwidth may be much more than alternate approaches.

These prior art networks do not teach the scalable circuit-switched national network needed for the twenty first century. It's that size matters in a manner that achieves high quality of service and security through a circuit-switched network.

Prior Art Network Descriptions

Prior art network patents and patent applications include US Patent Application Pub. 2005/0071484 A1 (Kang application), US Patent Application Pub. 2004/0246896 (Hoang application), US Patent Application Pub. 2004/0208644 (Sirat Application) and U.S. Pat. No. 7,058,296 (Saniee patent). These patents and patent applications are incorporated herein by reference. A high-speed network has also been proposed in a paper by Mori, et al. "Supercontinuum Lightwave Source Generating 50 GHz Spaced Optical ITU Grid Seamlessly Over S-, C-, and L-Bands", Electronics Letters, 20 Mar. 2003.

The Kang application discloses a large WDM mesh network. These conventional WDM networks require routers to accomplish the allocation of data through separation of data into streams of packets. The Mori article teaches a supercontinuum lightwave source with 50 GHz spacing. The Hoang patent teaches setting up a light path in an optical network in which wavelengths are fixed. The Sirat patent proposes a plurality of modulated sub-carriers with spacing of 1-10 GHz. The Saniee patent describes a wavelength allocation matrix.

Massively Parallel Computation

Recently, there have been tremendous advances made in high performance computation by means of dense networking of a large number of standalone computers. Rivaling performance of supercomputers at a fraction of their costs, these massively parallel computation (MPC) technologies have potential to enable critical applications that have thus far remained infeasible.

What is needed is a better communication network providing on a national scale optical switching without wavelength conversion.

SUMMARY OF THE INVENTION

The present invention provides a large communication network suitable for nationwide or worldwide utilization. The present invention overthrows the conventional packet switching technologies by an all-optical network. The technique uses tunable laser sources to generate large number of highly stable narrow-band optical signals, each serving as a communication channel. With packet processing replaced by all-optical channels, the network become highly secure and scalable while harnessing the virtually unlimited capacity of fiber-optic. A large number of nodes (called area code nodes) are connected with all-fiber-optic links with all-optical switches. A routing algorithm provides one or more communication links from each area code node to every other area code node so that information never has to change carrier wavelength as it travels the network. Each area code node contains circuits that are provided to connect individual users to the network.

The network includes at least 20 area code nodes, a network of optical fibers; a large number of dense wavelength division multiplexing components for providing at least 100 wavelength communication channels through each optical fiber in said network of optical fibers, a large number of processor controlled optical switches located at each of said area code nodes; a large number of electro-optical modulators to modulate user data onto said network of optical fibers at wavelengths within selected wavelength communication channels, and at least one processor programmed with a magic square routing algorithm adapted to utilize a requirements matrix and an allocation matrix in order to permit assignments of wavelength communication channels on a sub-second time scale for controlling the optical switches to permit a large number of single wavelength communication links through said network of optical fibers from each of said plurality of area code nodes to every other one of said area code nodes. The network also includes at least one optical signal generator for generating a plurality of narrow band optical reference frequency signals and a plurality of optical sub-frequency signals defining each of said at least 100 wavelength communication channels, with each communication link in each of said communication channels from each area code node to every other area code node within the network is routed without a change in wavelength and without optical-electrical optical conversion.

A first preferred embodiment of the present invention is a United States nation-scale high-speed communications network. The network provides dedicated, circuit switched connections between end users, and can support 100 million user nodes with 25 MHz of full duplex bandwidth per user. This amount of bandwidth can support 100 Mb/s data capability and/or multiple television channels. The method aggregates 15,000 MHz of bandwidth onto each of 300 different wavelengths at 50 GHz spacings using electro optical modulation and sub-frequencies spaced at 4 GHz. The standard link provides 1200 different fiber colors (consisting of 300 wavelengths on 4 fibers). Links are routed between 250 area code nodes using all-optical switches. Using a special routing algorithm applicants call "magic square," data never has to change carrier wavelengths as it traverses the network.

Security

Packet processing at each network element makes conventional MPC networks vulnerable to security threats. By obviating packet processing, the network of the present invention is inherently more secure. This benefit is of particular importance when geographically dispersed massive parallel computing (MPC) platforms are functionally consolidated to achieve higher scale performance.

Scalability

Today's densely interconnected MPC platforms cannot scale beyond a few tens of thousands of servers, far short of what would be demanded by critical applications such as real-time image signature recognition. Networks of the present invention will enable MPC platforms to scale to millions of servers, at least two orders of magnitude more than by conventional means.

Saving through Energy Efficiency

The most significant challenge faced by MPC platforms today is their energy needs. The needs impose not only high operating expenses but also scalability limitations on MPC platforms. Networks of the present invention will reduce network energy needs by at least 25%. This significantly reduces their operating expenses while making them more scalable.

BRIEF DESCRIPTION OF THE DRAWINGS

FIG. 17 shows bandwidth assignments and pairings for the assignments.

DETAILED DESCRIPTION OF PREFERRED EMBODIMENT

First Preferred Embodiment

Figure 1:
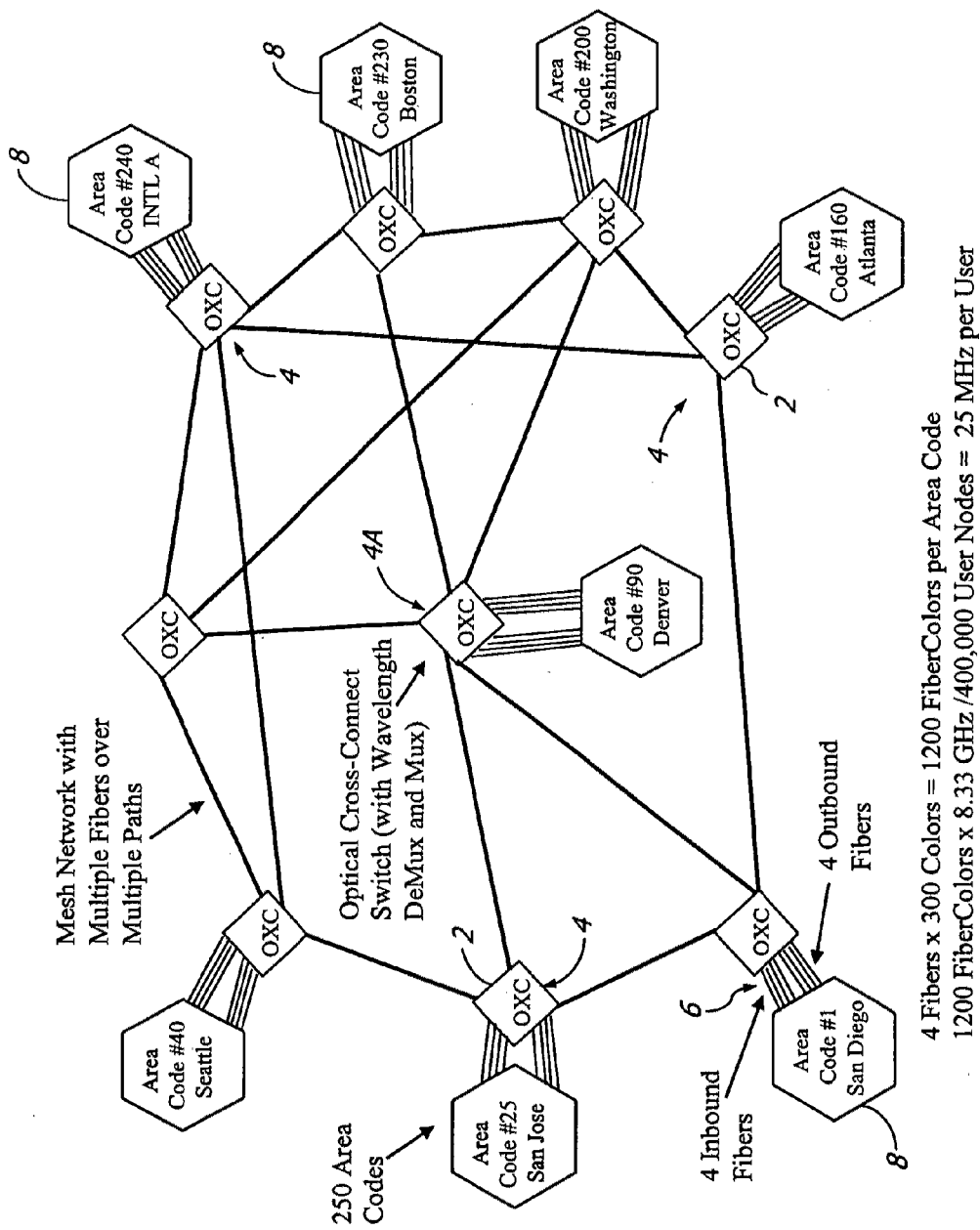
FIG. 1 is a drawing showing important features, including area code nodes, of a preferred embodiment of the present invention.

A top level description of a first preferred embodiment is shown in FIG. 1. In the discussion which follows, it should be understood that all quantities refer to a specific example of how the network might be implemented in a self-consistent manner, but that any specific numbers could be modified as the result of a more detailed analysis for a specific real world implementation. Here, for the first preferred embodiment, we consider a nation-scale network with end users assigned to one of 250 area codes with roughly equal numbers of end users in each. For instance, area code #1 has been assigned to San Diego, #40 to Seattle, #200 to Washington D.C., and #240 to some subset of international users. The proposed network can have about 400,000 User Nodes per Area Code. As seen in FIG. 1, Optical Cross-Connect switches (OXC's) 2 associated with each area code are located at mesh nodes 4 tied together in a mesh network which allows switching of optical signals from any particular area code to any other area code. The particular mesh network would make maximum use of intercity fiber trunk lines which have already been installed.

In this preferred embodiment all long haul communication is through optical fibers operating in the wavelength range centered at about 1.57 micron (corresponding to about 193.1 THz). The network is designed to operate at frequencies between 186 THz to 201 THz for a total bandwidth of 15,000 GHz. At 50 GHz spacings, this provides 300 "color" channels per optical fiber. Four separate fibers provide a total of 1200 communication channels.

There are in this embodiment 1200 separate wideband communications channels (each with 15 GHz of useable optical bandwidth) leaving and entering each area code. We call these wideband channels FiberColors, and they are distributed as 300 different DWDM wavelengths (standard 50 GHz spacing) on 4 separate fibers. The preferred optical network operates in the C and L bands at a center frequency at 193.1 THz. Thus there are 8 lit fibers between an Area Code and its corresponding OXC, 4 for outgoing traffic and 4 for incoming traffic as shown at 6 on FIG. 1.

If we divide 1200 FiberColors by the number of area codes 250 we have an average of 4.8 FiberColors per area code. However, the 1200 outgoing FiberColors from any particular area code (say San Diego) are allocated based on usage demand to the 250 area codes with a total bandwidth of about 15 THz per fiber. For instance, the FiberColors for traffic from San Diego might be allocated at a particular time as follows: 10 for traffic to Washington, 6 for traffic to Seattle, 1 for traffic to Atlanta, etc., until all 1200 FiberColors are accounted for. It is expected that the actual allocation will be automatically adjusted periodically as demand shifts with time of day and day of the week. Therefore, at any particular time, the OXC switches must be configured so that each FiberColor from each origination area code is guided through the network to its destination area code without interference. (That is, the same fiber cannot be used simultaneously for two FiberColors operating at the same wavelength). It was not immediately obvious that this could be done, but applicants have developed an algorithm for accomplishing this task which appears to be robust and to converge in a practically short time. We call this algorithm a "Magic Square Algorithm", because the underlying matrices of FiberColors which need to be allocated have rows and columns which add up to the same number. This problem of allocating FiberColors along with its solution is discussed in detail in the section of this specification entitled "Magic Square Software." The solution of this problem is a key technical innovation, as it enables the deployment of a nation-scale all-optical network with a relatively small number of channels without the disadvantages of having to convert any optical signal to an electrical signal or to another DWDM wavelength between the data source and the data destination area codes.

Operation of the OXC Switches 2 at the Mesh Nodes 4 is discussed in more detail in the section of this specification entitled "Optical Cross Connect Switches." In preferred embodiments, all DWDM wavelengths are demultiplexed before optical switching, and then remultiplexed after switching. No wavelength separation is required at a resolution finer than the standard 50 GHz DWDM spacing, so that standard components can be used. (Finer channel resolution only occurs within the source and destination area codes). Customized switches which combine wavelength separation with the optical switching may also be possible. Optical Amplifiers (such as erbium doped fiber amplifiers, EDFA's) are used throughout the network as necessary to maintain appropriate optical signal strength.

Area Code Operation

Figure 2:
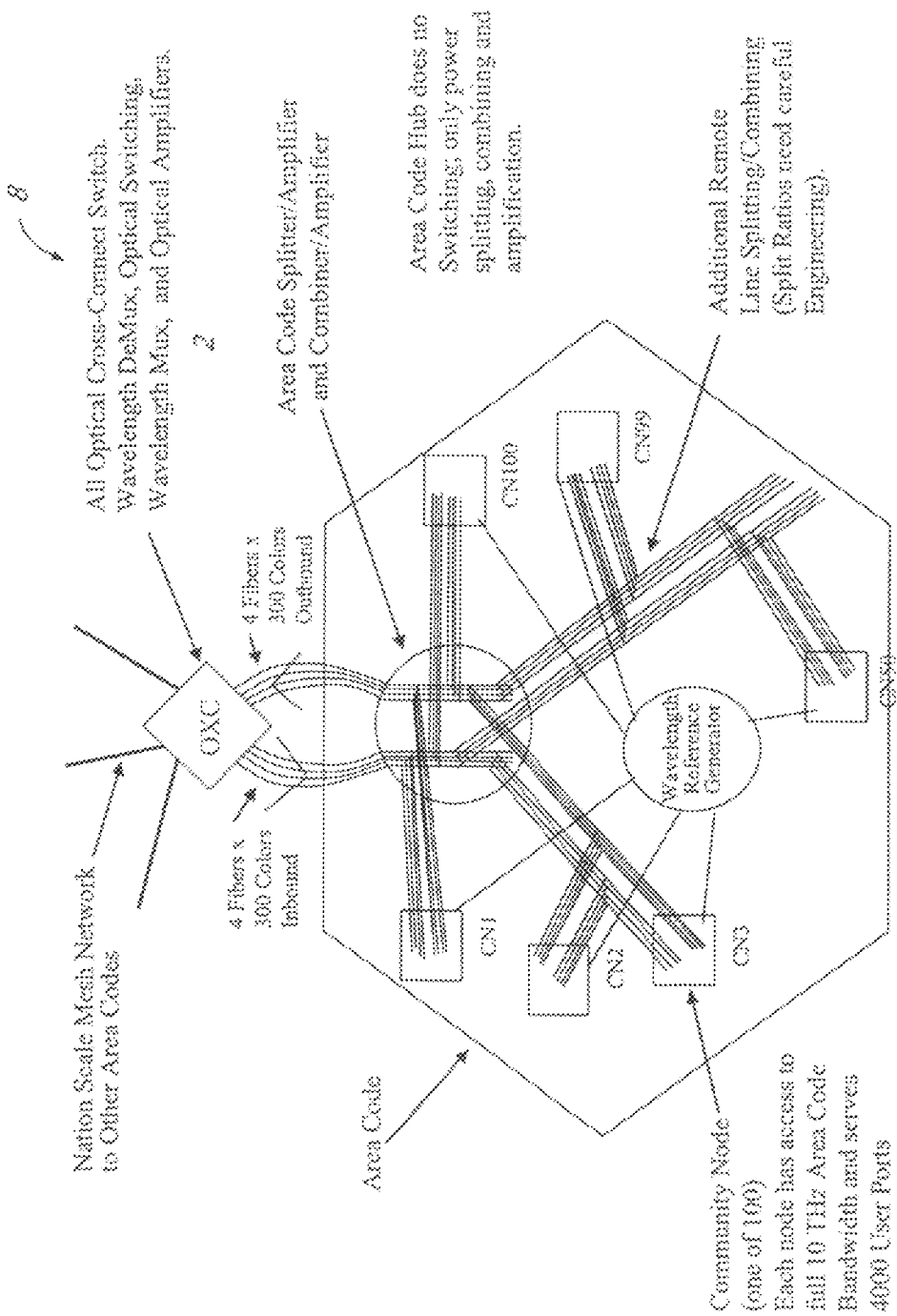
FIG. 2 show features of a single area code node including community nodes.

The implementation of a preferred area code network 8 at the Area Code level can be understood with reference to FIG. 2. Two main functions happen at the area code level. The first main function, which can be geographically distributed, is the passive splitting and combining of the four outgoing and incoming fibers to 100 different community nodes CN 1 to CN 100 as shown on FIG. 2. That is, each of the four incoming fibers to the area code is passively split into 100 different fibers going to different community nodes within the area code. Fibers from the 100 different community nodes are passively combined into the outgoing fibers. The minimum 20 dB loss associated with this process is compensated with optical amplification in the appropriate places. With this passive splitting and combining, the full 17.28 THz of bandwidth available in the area code is accessible at each community node. (Of this, up to 10 THz might be in use at one time, with 400,000 users having access to 25 MHz each).

Figure 5:
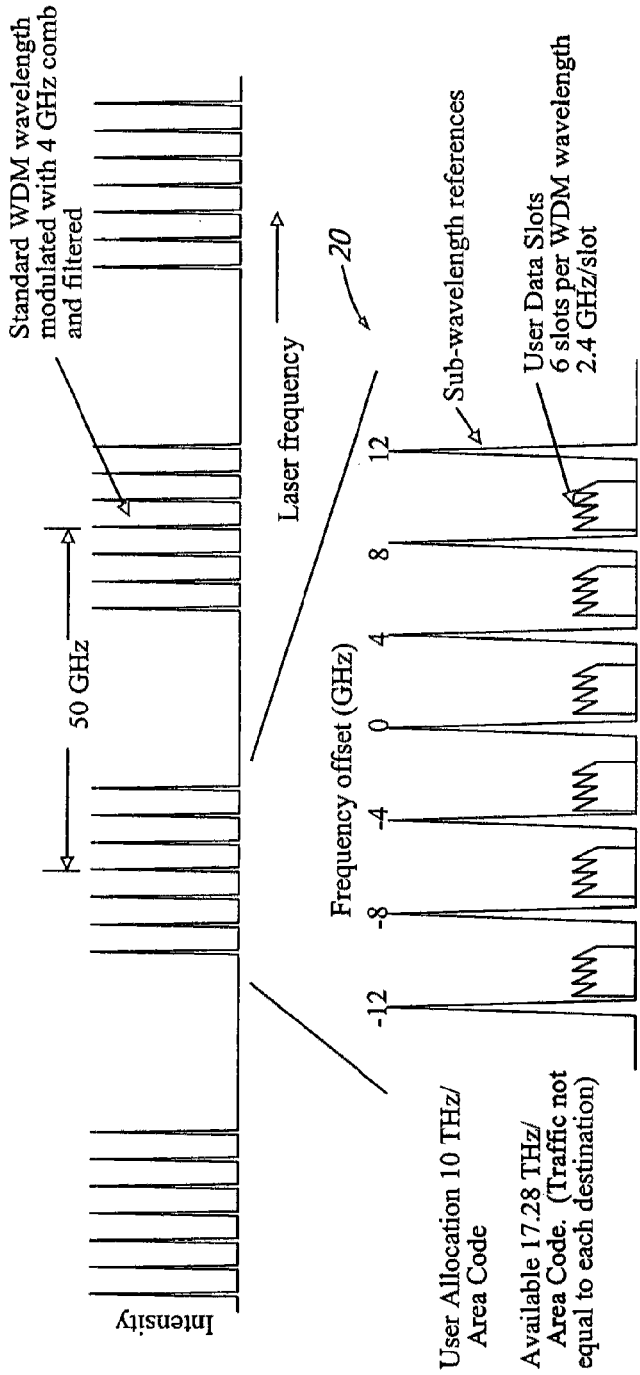
FIGS. 5 and 6 show features of a frequency comb.

The second main function implemented at the Area Code level (preferably with master signals generated at the national level) is the creation of wavelength reference combs defining optical sub-frequencies at a finer resolution than the standard DWDM grid. This reference comb, shown in FIG. 5 and discussed in more detail later, consists of narrowband optical reference signals with a 4 GHz spacing, stable on an absolute scale to about 500 MHz. Each of the 300 DWDM wavelengths separated by 50 GHz has 6 optical sub-frequencies associated with it as shown in FIG. 5. There are different ways to generate the reference frequency comb which are well known. Multiple stabilized lasers could be used and combined passively (with optical amplification), or fewer multifrequency fiber lasers with appropriate etalons could be used. The frequency comb is generated in the area code and distributed from there to the 100 community nodes to form the basis of carrier optical frequencies onto which the data is modulated.

Community Node Operation

Figure 3:
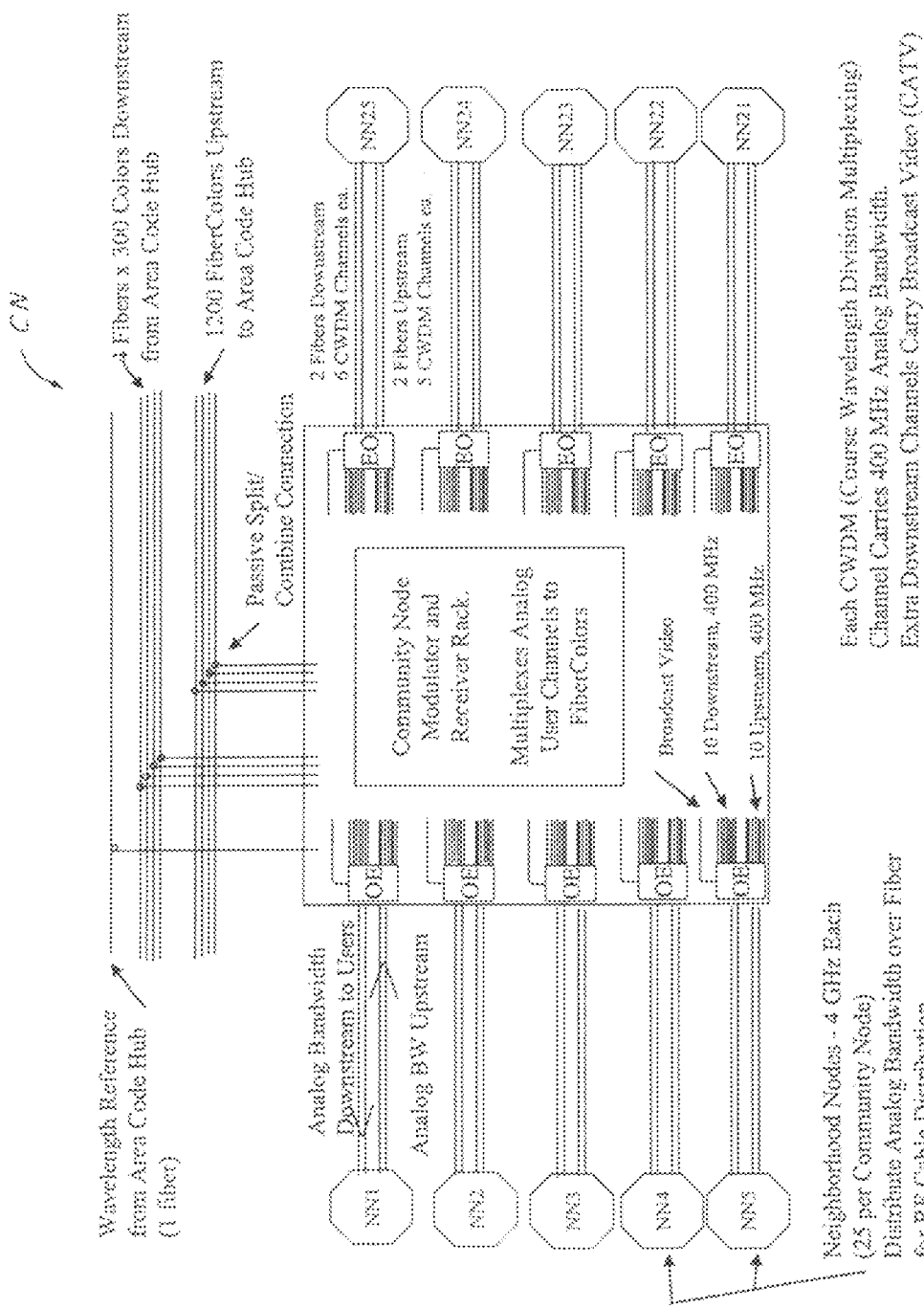
FIG. 3 shows features of a single community node including neighborhood nodes.

The community nodes contain the critical racks of equipment which modulate user data onto the optical sub-frequency carriers in the frequency comb, and demodulate data from the optical carriers for distribution to the end users. As shown in FIG. 3, each community node (CN) has access to all of the 1200 upstream and downstream FiberColors (through passive 295 splitters and combiners), and connects to 25 Neighborhood Nodes NN 1-25. The modulation and demodulation method is discussed later with reference to FIGS. 6 and 7. The community node takes upstream analog signals originating from different users and modulates them onto 25 MHz of spectrum within a particular FiberColor depending on the destination area code of the data. Similarly, the community node takes downstream optical signals, and demodulates 25 MHz of spectrum for forwarding on to a designated end user. Because of the distances involved, the user data is generally transmitted to and received from the Neighborhood Nodes over optical fibers, where Coarse Wave Division Multiplexing (CWDM) can be used as a cost effective solution. However, the user bandwidth is in the form of an analog oscillating electric voltage at the interface with the Community Node rack of modulators and demodulators. Up to 4 GHz of bandwidth is transmitted to or received from each Neighborhood node at a given time, allowing for 160 users at 25 MHz each. Extra CWDM fibers are used to carry broadcast video information to the Neighborhood Nodes for shared use among multiple users. The details of the community node are displayed in FIG. 3.

Neighborhood Node Distribution

Figure 4:
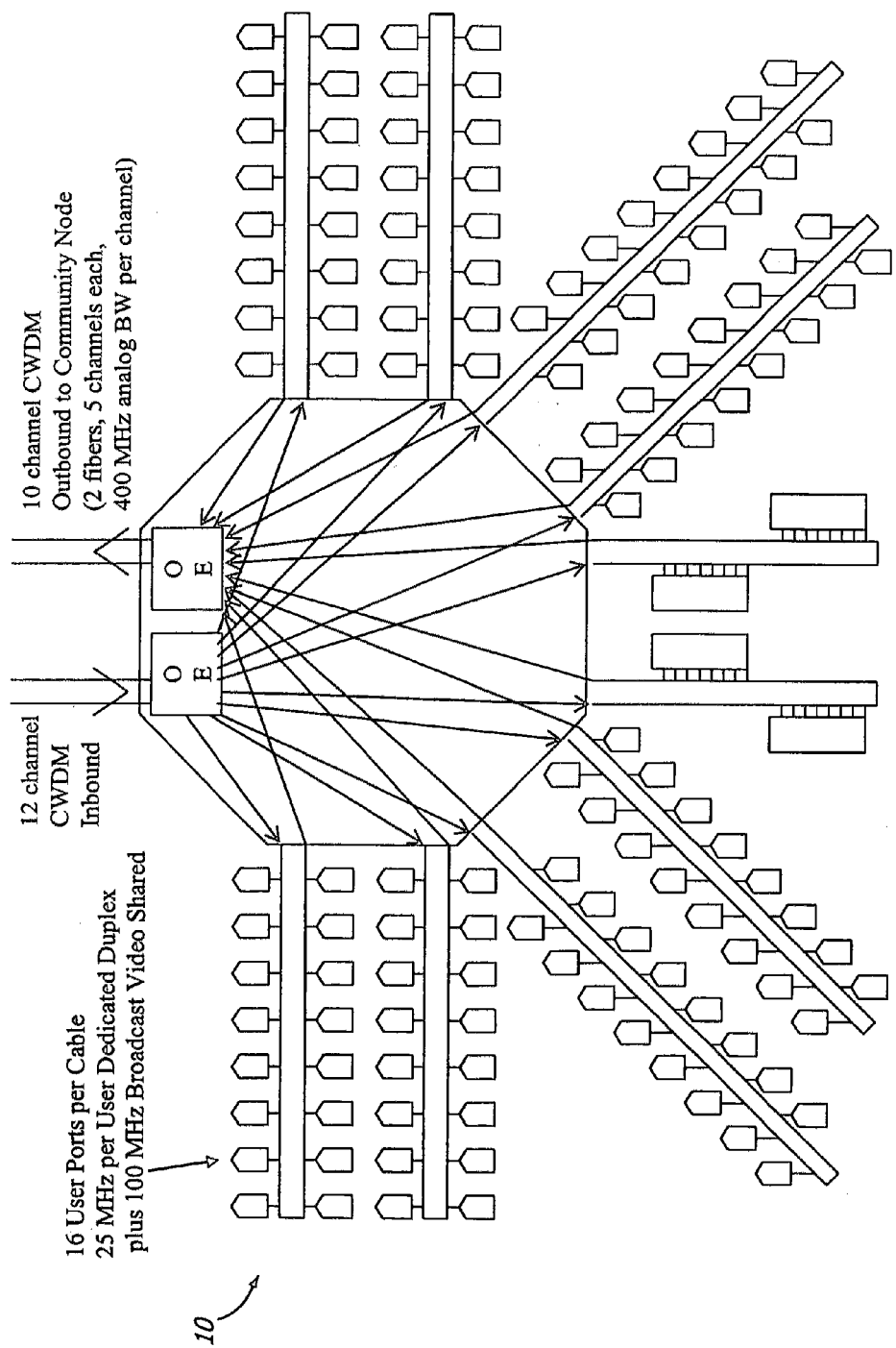
FIG. 4 shows features of a single neighborhood node.

The neighborhood node (shown in FIG. 4) is basically an analog collection hub. End users (such as houses or employees in an office) are connected to analog coaxial cables in groups of 16 as shown at 10 in FIG. 4. The cables are operated using 900 MHz of bandwidth, with 25 MHz per user downstream, 25 MHz per user upstream, and 100 MHz of shared broadcast video bandwidth (with appropriate isolation bands). This allocation would be modified as necessary to make maximum use of already installed cable systems. The signals from 10 cables in each Neighborhood Node (serving 160 end users) would be combined onto fiber optic cables for communication with the Community Node using standard CWDM techniques. Each end user could basically use their 25 MHz of analog bandwidth as they 320 pleased, paying for end-to-end circuit switched connections to the user with which they were communicating. Connection to multiple simultaneous data sources or recipients is handled by division of the user bandwidth at the Community Node before modulation onto the optical carrier.

Optical Subfrequency Comb

A critical part of the preferred ColorFast network is the generation of the accurate frequency reference comb 20, shown in FIG. 5. This allows the precise placement and retrieval of 25 MHz user bandwidth channels. After generation of the sub-frequency reference, relative frequency offsets are used, so that the components themselves do not have to have accurate absolute wavelength calibrations, which would be expensive. The reference sub-frequency comb is either built up from separate modulated, filtered and amplified DWDM lasers, or from fiber lasers. By doing this at the Area Code level, the expense is distributed over many end users. The comb 20 includes 6 sub-frequencies (separated by 4 GHz) for each DWDM wavelength range (separated by 50 GHz) as shown in FIG. 5. Modulation and demodulation of data at the DWDM wavelength level is only done at the Community Nodes, so that the Network Optical Switches at these wavelength ranges are not required. User data is modulated directly into the spaces between the reference sub-frequencies using electro-optic modulators. Some part of the reference comb is transmitted across the network along with the user data, helping to provide frequency calibration at the receiver electronics. Each of the 6 optical sub-frequencies is associated with 2.4 GHz of bandwidth for user data. The bandwidth is limited to allow the use of lower cost silicon electronics, rather than requiring more expensive, higher bandwidth materials.

User Data Modulation

From User to Network

Figure 7:
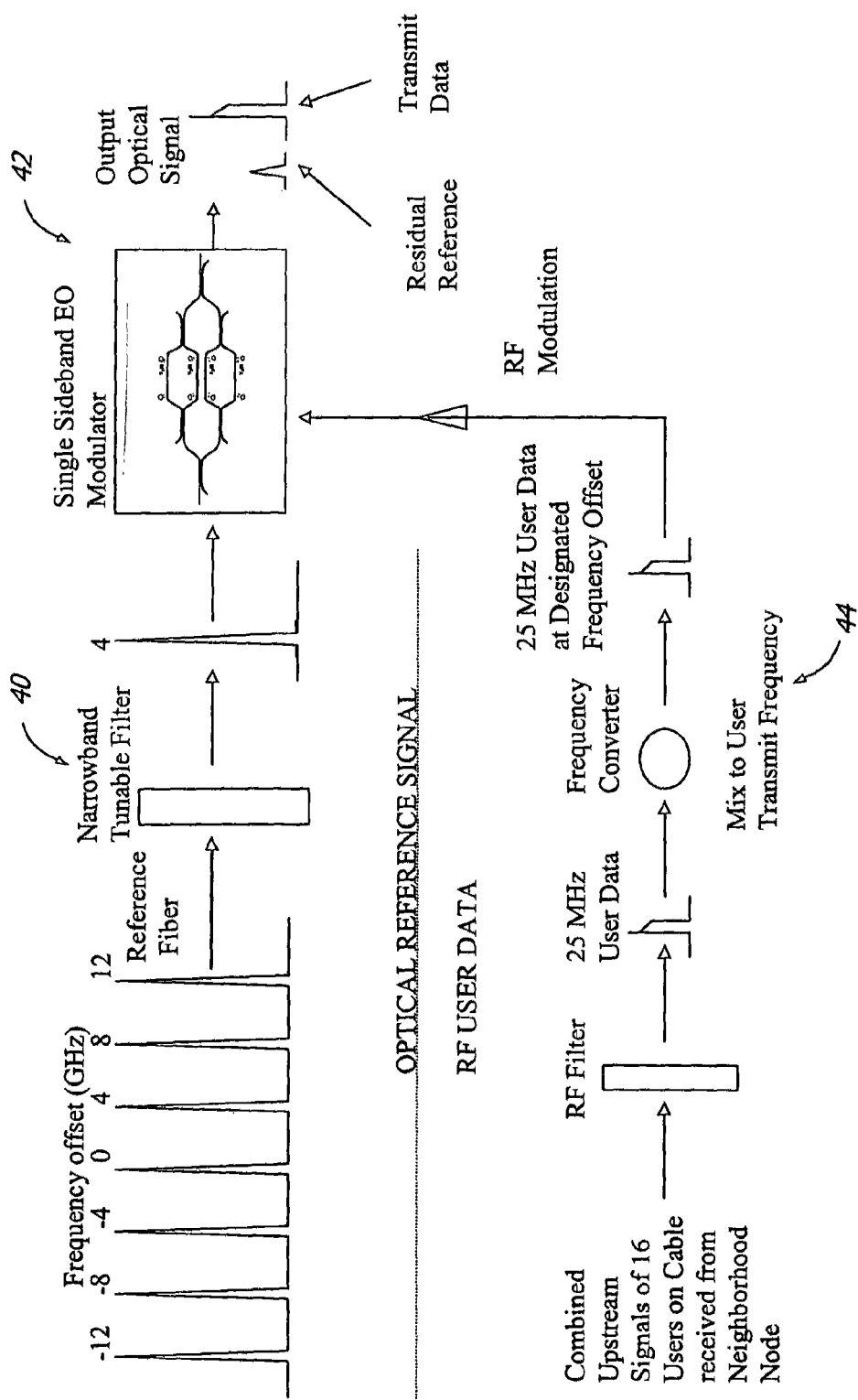
FIG. 7 describes a process for modulating data into a sub-frequency.

The process of modulating data from the end user onto a particular optical sub-frequency is shown in FIG. 7. The optical signal originating from a reference fiber (after appropriate optical amplification) is passed through a narrowband tunable filter 40 to isolate the desired sub-frequency. (The tunable filter can be calibrated by sweeping over the sub-frequency comb). The isolated narrowband frequency source is sent through an arrangement of electro-optic modulators 42. The modulation source is obtained from the end user by passing the upstream RF cable signal through an RF filter to isolate the 25 MHz of user data and passing that through a frequency converter so that it is at the frequency offset (designated by the network control for the particular end to end data transmission session) as shown at 44. The output of the EO modulator arrangement contains some residual reference signal, along with the 25 MHz of user data at the appropriate optical frequency offset. Details of how the electro-optic modulator achieves this result while minimizing extraneous sidebands are given below in a section entitled "Network Node Modulator". This is a critical technology for the proposed ColorFast network. The different modulator outputs are then combined passively (with appropriate filtering and optical amplification) resulting in a broadband signal to be transmitted across the network on a particular FiberColor.

From Network to User

Figure 6:
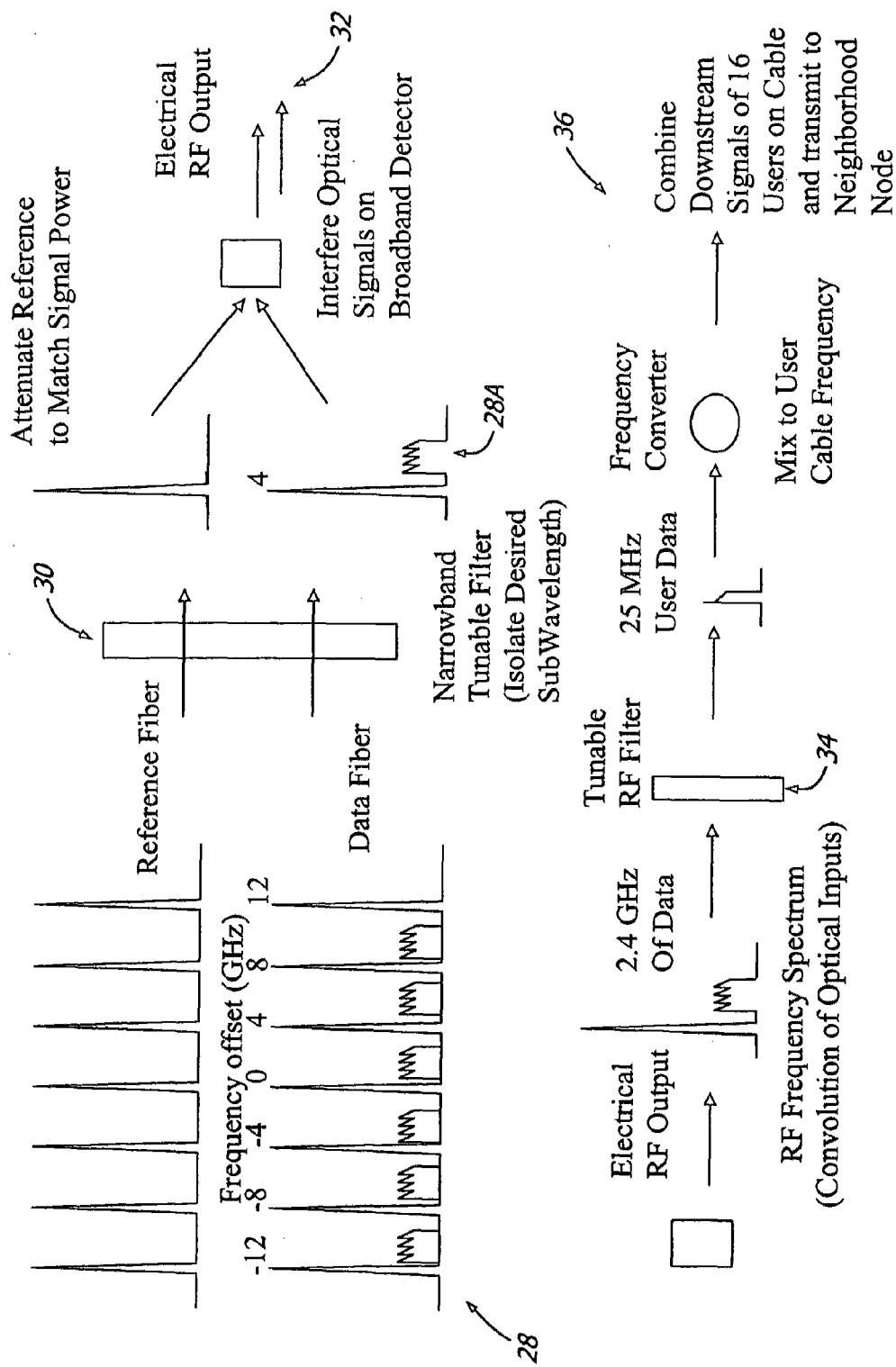

FIG. 6 shows details of how the preferred ColorFast network transfers a FiberColor from the origination area code to the destination area code. Embedded in that FiberColor are six 2.4 GHz data channels 28 for multiple recipients in the destination area code. Demodulators at the Community Nodes can be tuned to retrieve the appropriate 2.4 GHz channel 28A. Demodulators can be shared among different end users in the same Neighborhood Node. First, data from one of the four fibers is sent along with the signal from a reference fiber 370 through a narrowband tunable filter 30. (The four fibers can either be switched to go through the appropriate demodulator, or separate demodulators can be designated for different fibers.) The tunable filter contains both broadband and narrowband etalons to select a particular desired 4 GHz sub-frequency band. After attenuating the reference signal to match the intensity of the received data, the reference and data optical signals are combined on a broadband detector where they interfere. (In practice a pair of detectors might be used to analyze an in-phase and out-of-phase component to get better noise performance). The electrical output of the detector circuitry 32 contains the 2.4 GHz of user data associated with the particular sub-frequency. This is sent through a tunable RF filter 34 to separate out the desired 25 MHz of end user data. The carrier frequency of the data is then shifted to the allocated cable frequency of the end user, and combined with other end user data from other modulators before being sent to the Neighborhood Node and on to the end users as shown at 36.

Mesh Node

In the preferred ColorFast network architecture mesh nodes are responsible for providing all traffic routing and switching. The mesh nodes receive configuration commands from the computers that calculate the routing paths. Mesh nodes are located in the interior of the network as shown at 4A in FIG. 1 and at the edge of the network as shown at 4 in FIG. 1. The nodes act upon these commands, re-provisioning the network to provide bandwidth where it is required. The mesh nodes accomplish this provisioning and routing using all-optical cross-connects that are independent of protocol and encoding schemes. The routing computers are not necessarily contained in the mesh node although they may be. If not inside the mesh node, the mesh node receives routing commands from elsewhere in the network.

Mesh nodes in the interior of the network are responsible for switching colors to the proper location, and for providing some local add-drop and channel monitoring capability. Mesh nodes at the edges of the network provide an interface between the network and local area code traffic.

Figure 8:
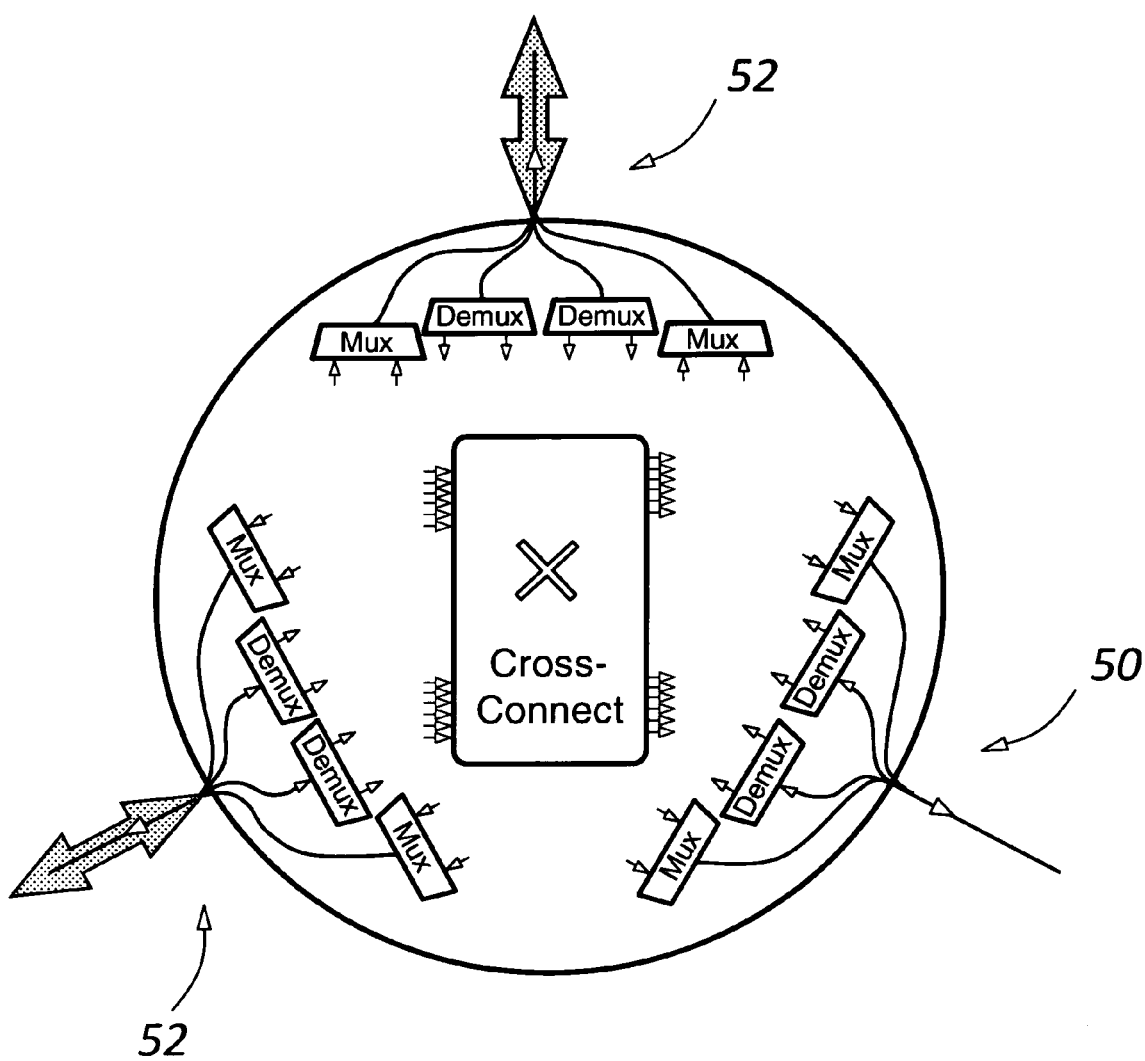
FIGS. 8 and 9 show feature of mesh nodes.

An example of a simplified mesh node is shown in FIG. 8. It has two mesh-node to mesh-node connections 52 and one area code or local connection 50. For simplicity each connection contains only two input and output fibers instead of the 4 input and output pairs which is the baseline for the preferred architecture, and each fiber contains only two colors instead of the 300 envisioned for the actual network. Immediately after entering the node each input fiber is passed through a passive optical demultiplexer that breaks the incoming light into the 300 50-GHz color bands. Each color from all the input fiber is then input into an optical cross-connect switch and routed to a passive optical multiplexer. The optical multiplexer combines the 50 GHz color bands onto the output fiber which carries them to the appropriate area code or next network node.

The number of connections that can be supported by the mesh nodes is only limited by size of the optical cross-connect switch. Since each fiber is separated into its constituent colors before switching, the number of input and output ports which require switching grows quite rapidly. For example, a node having 3 connections each with 4 fibers and 300 colors per fiber 415 requires switching for 3600 input and output ports. However, notice that since each input or output fiber can only carry one channel of each color, the switch does not need to provide full connectivity between all input and output ports. Thus, for the example given above, 300 small 12×12 cross-connects provide the required switching capability. For a node having 8 connections with four fibers per connection (32 fibers) and 300 colors per fiber each input 420 color channel can be routed to one of the 32 output fibers. Thus, a large switch can be used which only provides connectivity between an input port and its 32 nearest neighbors. Alternatively 300 smaller 32×32 port switches could be used. Due to this reduced connectivity requirement a extremely large mesh node with 32 connections could be supported by a switch of moderate size such as a 256×256 MEMS based optical cross-connect.

The mesh nodes require a large number of optical multiplexing and demultiplexing units. However, this preferred ColorFast architecture does not require the development of devices different from those currently being made for telecommunications applications. The ColorFast requirement for demultiplexers and multiplexer are functionally equivalent to currently available 50 GHz DWDM filters. Several currently available technologies can provide suitable channel separation including thin-film technology, diffraction gratings and arrayed waveguides.

Mesh nodes will also be convenient places to accomplish network grooming and signal amplification. For the sake of clarity this functionality has not been included in the initial description of the mesh nodes because it is not strictly required for switching. But in the deployed nodes signal grooming and amplification will preferably be included in each node in varying degrees depending upon the transmission requirement between the node's connections.

Figure 9:
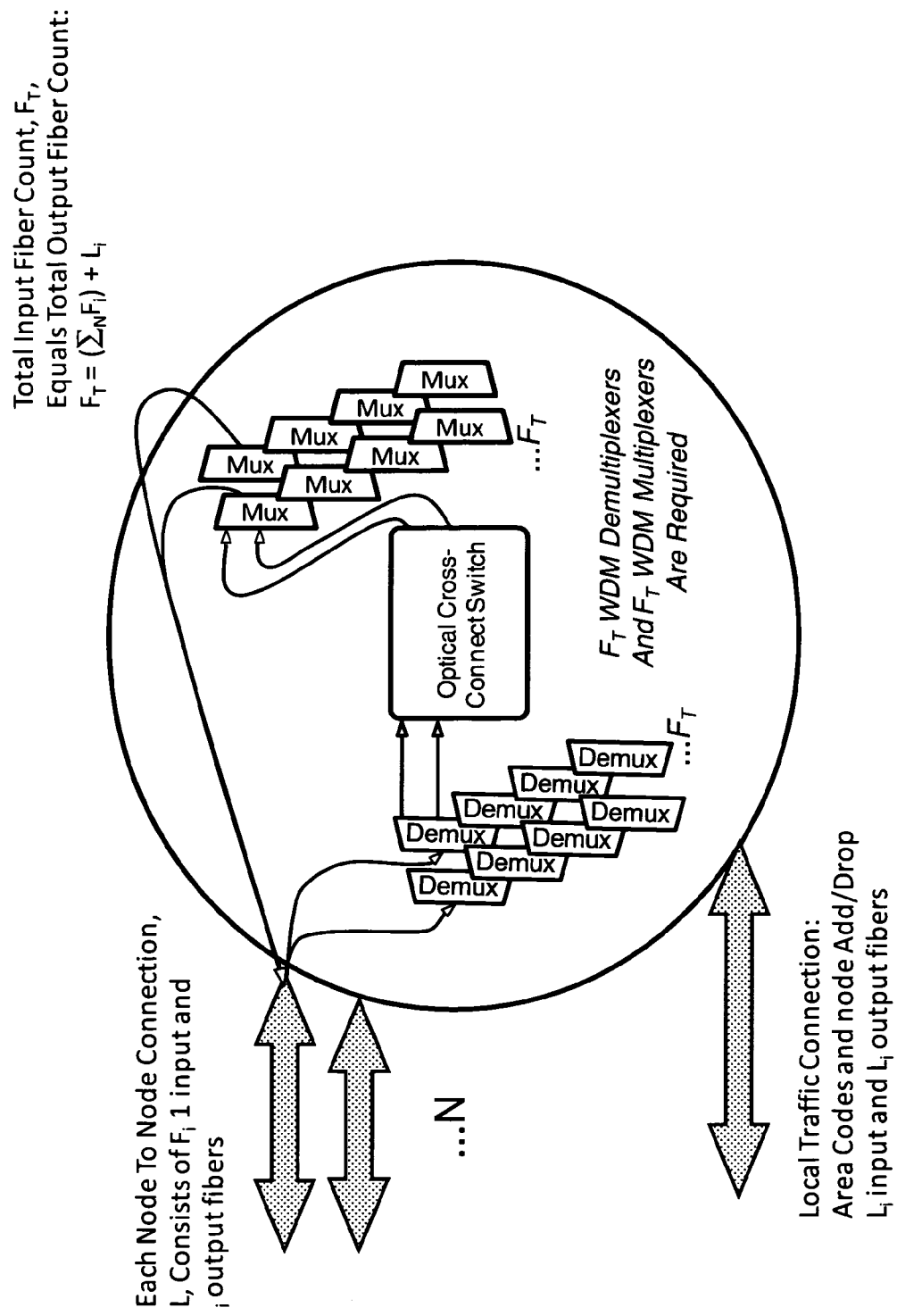

Calculating the required resources for a mesh node of any size is relatively easy. Refer to FIG. 9 which shows a generalized mesh node. The total number of connections to a particular mesh node is expressed as $N=N_M+N_L$, where $N_M$ is the number of mesh node connections and $N_L$ is the number of local connections. So if there are $F_i$ fibers at the $i^{th}$ mesh node to mesh node connection and $L_j$ fibers at the $j^{th}$ local node connection, the total number of input and output fibers, $F_T$ at the node are $$F_T = \sum_i^{N_M} F_i + \sum_j^{N_L} L_j.$$

Thus $F_T$ multiplexers are required, $F_T$ demultiplexers are required, and if $n_c$ is the number of colors per fiber then the total number of ports $X_T$ required by the optical cross-connect is $$X_T = n_c F_T.$$

Neighborhood Node Modulator

Figure 10:
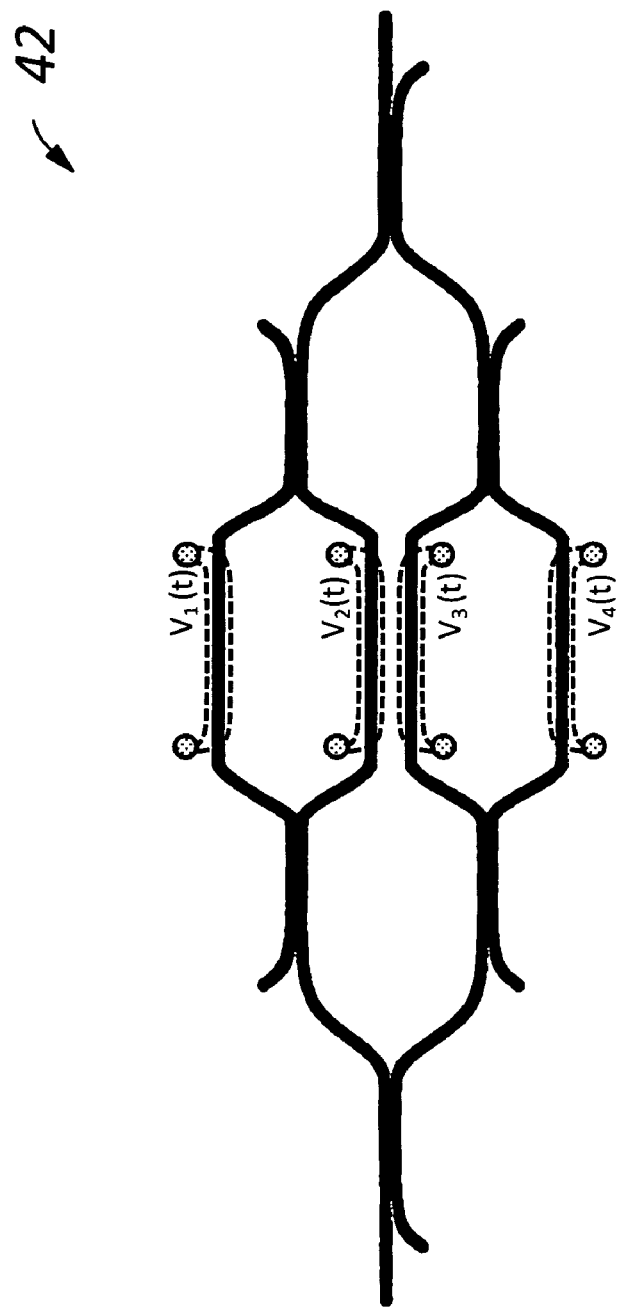
FIGS. 10, 11A and 11B show features of and results from Mach-Zehnder interferometers.

FIG. 10 is a drawing of a neighborhood node modulator shown as 42 on FIG. 7. This preferred modulator is comprised of two Mach-Zehnder interferometers placed in parallel. Mach-Zehnder interferometers are fairly common in fiber optics communications systems and are often used as external modulators for transmission of data. They are often implemented as waveguides in a Lithium Niobate substrate and commonly have one leg with optical path length that can be varied by applying a voltage across the Lithium Niobate crystal. They are suitable for use with high frequency communications systems and can be modulated at bandwidths in excess of 50 Ghz. Since the modulation proposed for the ColorFast system is more sophisticated than that required in current communications systems two interferometers are required to accomplish the required frequency shift and modulation. It is also easiest to implement the ColorFast scheme if all legs of the interferometers are fabricated such that they are independently variable.

FIG. 10 is a schematic diagram of a dual parallel Mach-Zehnder frequency shifter suitable for generating the ColorFast super-fine wavelength carriers. The reference color is input into the waveguide on the left. A mode coupler is used to distribute half of the input light to each of the parallel Mach-Zehnder interferometer. The optical path lengths of each leg of the interferometers are controlled by RF input voltages. If done correctly the output of this device is a communications signal with data modulated onto a color-shifted carrier.

When the signal voltages are $$V_1(t) = M_x \cos(\omega_{rf} t),$$

$$V_2(t) = -M_x \cos(\omega_{rf} t),$$

$V_3(t)=M_x \sin(\omega_{rf}t)+\pi/2$, and $V_4(t)=-M_x \sin(\omega_{rf}t)+\pi/2$.

The result at the output is light with the input frequency of the light suppressed and spectral components shifted by multiples of $\omega_{rf}$.

Figure 11A:
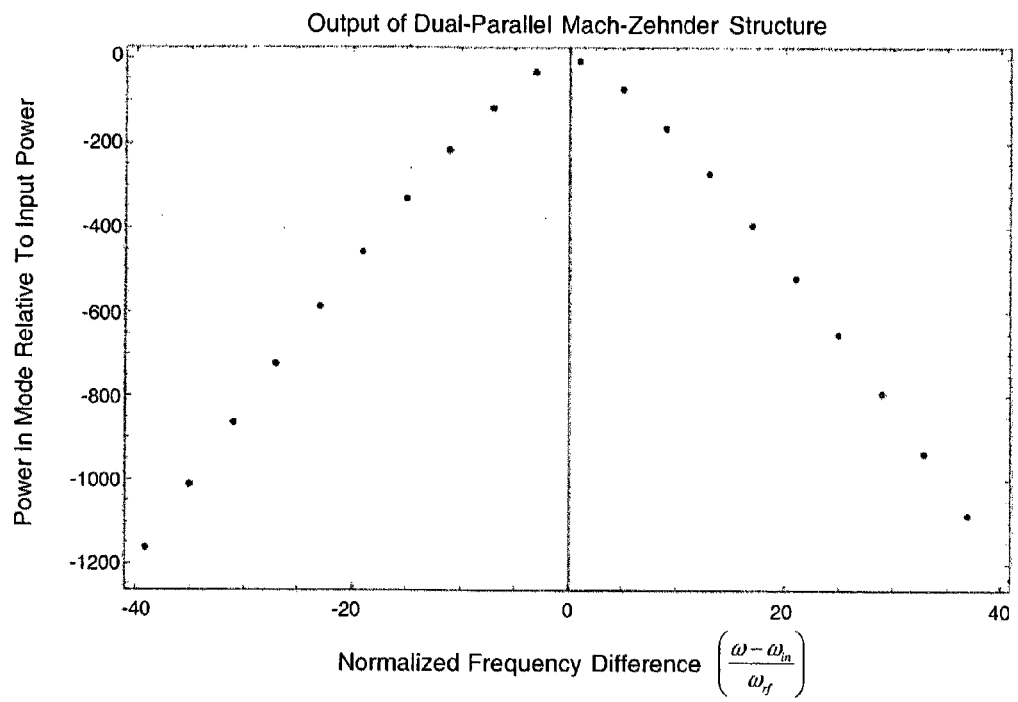
Figure 11B:
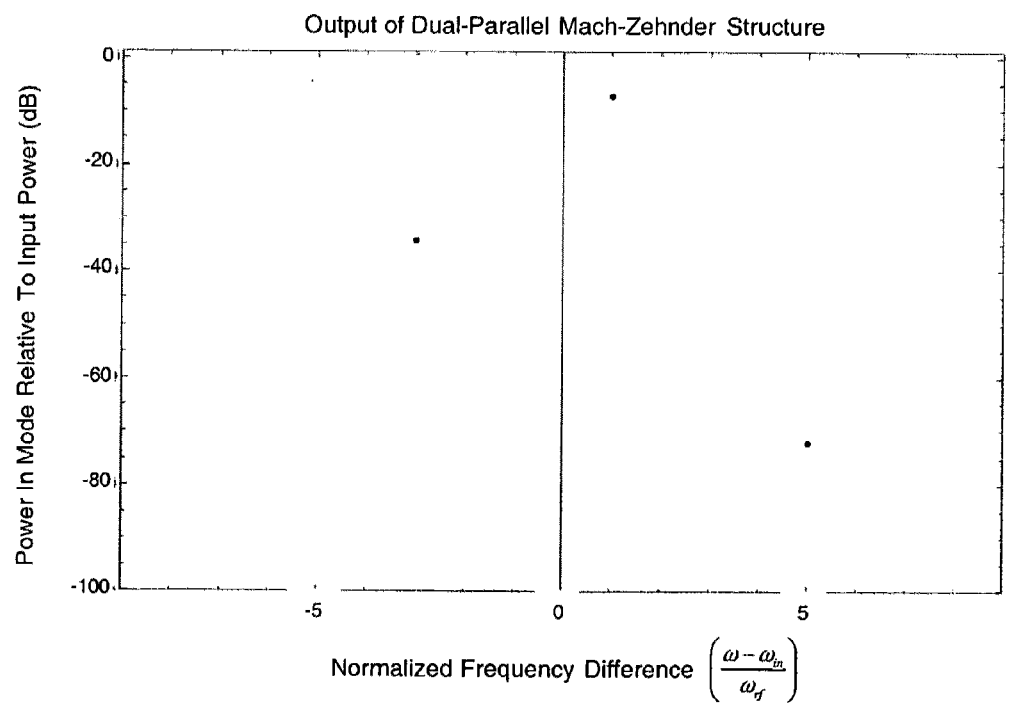

The color shifting is accomplished by using an RF carrier frequency $\omega_m$, for each of the signal voltages, and encoding the communications information into the signal is accomplished with the time varying function a(t). In this configuration the output of the device is a primary lobe of optical energy shifted in frequency from the input energy by $\omega_m$, and side lobes of energy at frequencies shifted by other multiples of $\omega_m$. If configured correctly the efficiency of the double Mach-Zehnder device can be quite high so that nearly half of the input energy is transferred to the output in the primary frequency lobe at $v_o+\omega_o$, where $v_o$ is the frequency of the reference light injected into the input. In this configuration the power in the side lobes is also quite low (approximately −30 dB of the power in the primary lobe). This is illustrated in FIGS. 11A and 11B which show plots of the optical power at the output of the devices versus frequency. In FIG. 11A enough spectral range is included to see the primary lobe and its nearest side lobes. In FIG. 11B a larger spectral range is shown. The power in the primary lobe at $v_o+\omega_o$ referenced to the input power is about −5.0 dB. The power in the next highest lobe at $v_o-3\omega_o$ is about −30 dB.

Magic Square Software

One of the main difficulties associated with all-optical networks is the need for DWDM colors to be changed as they pass through the core switching network. The need comes from traditional switching architectures such as Clos-type to "scramble" or rearrange sub-channels in order to achieve full connectivity.

Figure 12:
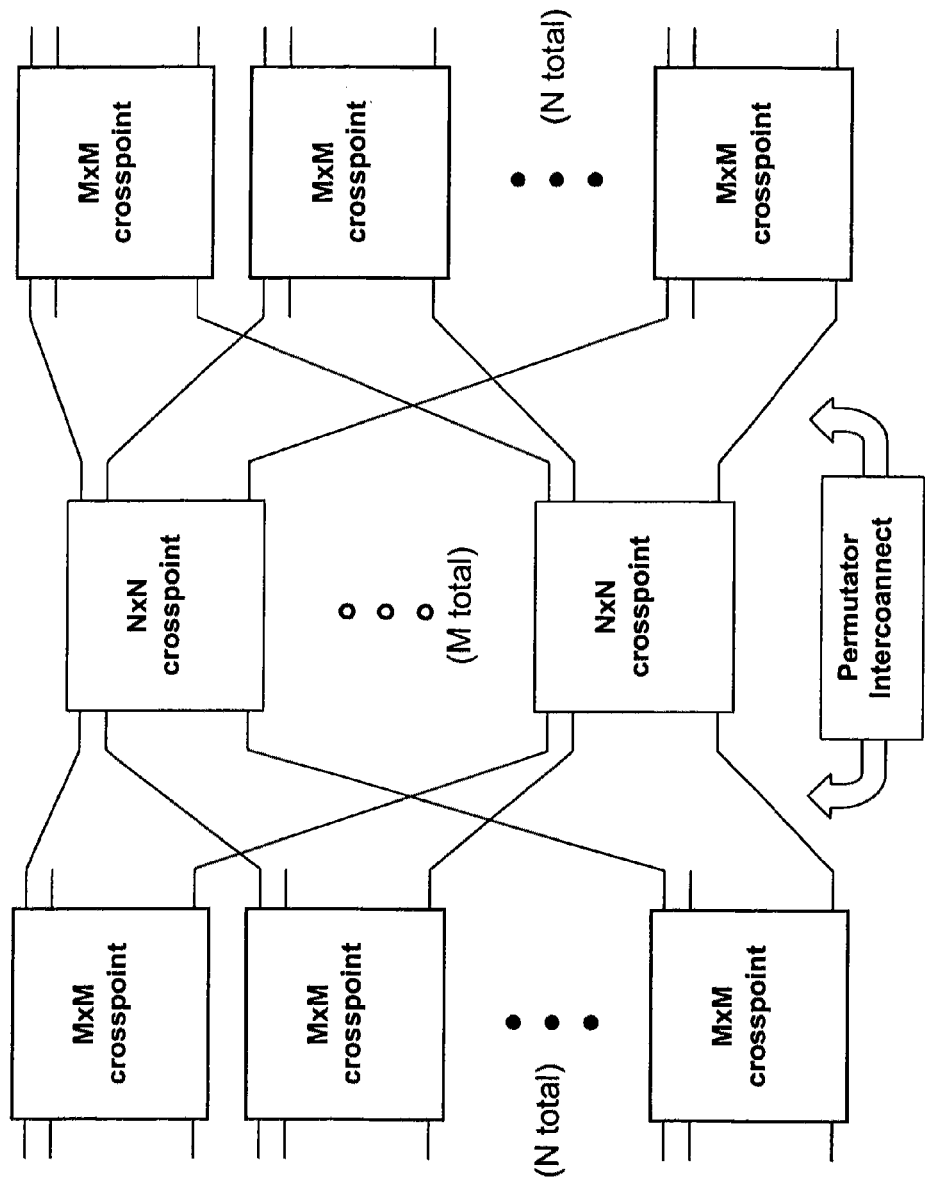
FIG. 12 is a schematic drawing of a three-layer Clos-type switch.

FIG. 12 shows a schematic of a basic 3-layer Clos switch. Full non-blocking connectivity is achieved between N*M inputs to N*M outputs with the number of switch elements being $$2*N*M^2+M*N^2=M*N*(2*M+N),$$

rather than $$(M*N)^2$$

for a fully populated switch. This is a large savings if M and N are large. Many-layer Clos switches can achieve even better performance.

The drawback of switching architectures such as the one above is the need to "scramble" the signals in between the crosspoint switches. In the case of the core network, N roughly corresponds to the various fibers coming into a node, and M roughly corresponds to the individual DWDM colors. In order to switch fiber-colors arbitrarily, in the prior art, the system must be able to convert the colors.

In the case of SONET, it is pointless to avoid color conversion, as the fiber-colors are (usually) converted to electrical before they are switched anyway. This process is called OEO (for optical-electrical-optical). Since the switched electrical signals are converted back to light, they might as well have been produced at a different color to start with.

All-optical networks typically require a similar step, but rather than using OEO conversion, most architectures use some kind of non-linear optical wavelength converter, which in many cases is more difficult than a conventional OEO.

In order to greatly increase network capability, an all-optical core should avoid color conversion altogether. The trick is how to do this.

Avoiding Color Conversion

If there were a way to assign colors so that provisioning were unnecessary, the core network could be very simple, and thus could handle enormous data rates. The major components would consist of:
  Conventional fiber amplifiers
  MEMS-type optical switches
  DWDM splitters/combiners
  No color changing.

Burden is shifted to other parts of the network, most notably the provisioning algorithm, but also onto the system modems:

1. The provisioning algorithm must now take the connection requirements, which is the bandwidth requested between every pair of nodes, and convert this into fiber-color assignments, which are the colors and fibers that are assigned to connect each pair of nodes. This task is mathematically complex, and it is not immediately obvious that there is even a solution. The difficulty is that, as colors are allocated, certain colors want to be used by multiple links as the other colors are used up. Eventually (without the proper algorithm) the colors cannot be properly allocated, creating a "collision". The algorithm to solve this problem is discussed in the next section.

2. The link assignment between two core nodes or "area codes" takes place over certain defined colors that are generated by the provisioning algorithm. The modems to generate and receive the signals must operate at these assigned DWDM frequencies. This requires a frequency tuning capability on the modems. This frequency-agile modem is described in a following section entitled "Frequency Agile Modem."

Solving these two problems allows bandwidths to the home to be increased by orders of magnitude, as it removes the bottlenecks lying between users.

Solving The Allocation Problem

The provisioning algorithm must take the input connection requirements, which is the number of DWDM channels needed between each node, and output fiber-color assignments, that is, a color and path for each one of the DWDM requests. We call the connection requirements the "requirements matrix" or "R-matrix", and output an "allocation matrix" or "A-matrix".

This algorithm is difficult because, if performed in an unsophisticated manner, certain colors "run out" when they are needed by too many links. This causes "collisions" which are unacceptable solutions.

To get a feel for the problem, we will present a simple hypothetical example. Consider the following R-matrix:

| R-matrix | San Diego | Washington | New York | Chicago |
|---|---|---|---|---|
| San Diego | 4 | 1 | 2 | 3 |
| Washington | 3 | 1 | 2 | 4 |
| New York | 2 | 1 | 4 | 3 |
| Chicago | 1 | 7 | 2 | 0 |

There are a total of 10 colors available to be allocated. The table shows, for example, that Chicago desires 7 colors to transmit data to Washington. The trick now is to assign the 10 colors (0 through 9) so that each city is assigned each color exactly once for both receiving and transmitting.

First, allocate color 0 as follows:

| Color 0    | San Diego | Washington | New York | Chicago |
|------------|-----------|------------|----------|---------|
| San Diego  |           | 0          |          |         |
| Washington | 0         |            |          |         |
| New York   |           |            |          | 0       |
| Chicago    |           |            | 0        |         |

Notice that the color appears exactly once in each row and column.

This leaves a reduced R-matrix for the remaining 9 colors:

| R-(1-9)    | San Diego | Washington | New York | Chicago |
|------------|-----------|------------|----------|---------|
| San Diego  | 4         | 0          | 2        | 3       |
| Washington | 2         | 1          | 2        | 4       |
| New York   | 2         | 1          | 4        | 2       |
| Chicago    | 1         | 7          | 1        | 0       |

Notice that now each row and column adds to 9. Continuing in this matter, it is a fairly simple matter to allocate the rest of the colors by inspection:

| A-matrix   | San Diego  | Washington       | New York   | Chicago    |
|------------|------------|------------------|------------|------------|
| San Diego  | 1, 2, 3, 4 | 0                | 7, 9       | 5, 6, 8    |
| Washington | 0, 7, 8    | 9                | 5, 6       | 1, 2, 3, 4 |
| New York   | 5, 6       | 8                | 1, 2, 3, 4 | 0, 7, 9    |
| Chicago    | 9          | 1, 2, 3, 4, 5, 6, 7 | 0, 8     |            |

We can see that this is a valid solution because each row and column has each color exactly once, and the number of colors in each box corresponds to the value in the R-matrix.

Now lets try again, but this time we will start to allocate color 0 in a bad way:

| Color 0    | San Diego | Washington | New York | Chicago |
|------------|-----------|------------|----------|---------|
| San Diego  |           |            | 0        |         |
| Washington |           | 0          |          |         |
| New York   | 0         |            |          |         |
| Chicago    |           |            |          | ???     |

Notice that our first three allocations force color 0 into a 4th box that needs no color, and so is a bad allocation. It may seem obvious in this 4×4 example that the first choices were bad; but remember that there are only 4!=24 permutations of each color. A human can easily "eyeball" all 24 permutations to find a good one. Once the number of nodes gets larger than 10 or so, it becomes nearly impossible for an unaided human to allocate the entire matrix, as each color now has 10!=3628800 permutations. The problem seems to be most difficult when there are only a few colors remaining.

An algorithm to solve this problem was developed by applicants. We call it the "Magic Matrix" algorithm, because the matrices are similar to the mathematical puzzle "magic squares". The input is an R-matrix such as that shown in FIG. 13.

Here there are 20 input and output channels, with the number of colors requested represented by the intensity, ranging from 0 to 15. Each node is limited to 100 colors total for input (row) and output (column).

The algorithm iteratively assigns wavelengths in such a way as to avoid collisions. In a preferred embodiment the algorithm is processed using the well known MathCad software. The following example illustrates this preferred process. Applicant refers to the software as his "Magic Matrix Software". The source code for this software is provided in the next section.

Magic Matrix Software

We start with the connectivity matrix that we want to solve. The following matrix is a randomly generated matrix which represents the bandwidth required at a particular time for the row users transmitting to the column users. These 'users' may represent cities or regions of the country. We have assumed here that the connectivity values may be asymmetrical, which means that transmitting requirements may be different from the receiving requirements for a given pair of users (in other words, A(i,j) can be different from A(j,i)). For example, A(2, 4) is 7 and A(4,2) is 4. If the connectivity happens to be symmetrical, then there is no change in the algorithm, as it is just a subset of the more general case demonstrated here. In addition, we have assumed that there is a self communication requirement (in other words, A(i,i) not necessarily equal to 0). For example A(3,3) is 5. The diagonal terms can be set to zero again with no change of the algorithm.

$$A := \begin{pmatrix} 6 & 5 & 5 & 8 & 7 & 7 & 6 & 5 & 6 & 5 & 1 & 2 & 1 & 2 & 2 & 6 & 8 & 5 & 6 & 7 \\ 8 & 4 & 9 & 7 & 3 & 7 & 7 & 3 & 4 & 7 & 5 & 2 & 7 & 3 & 1 & 5 & 3 & 6 & 5 & 4 \\ 10 & 3 & 5 & 0 & 5 & 2 & 8 & 7 & 7 & 5 & 5 & 4 & 6 & 4 & 7 & 5 & 4 & 8 & 0 & 5 \\ 4 & 4 & 4 & 7 & 5 & 4 & 2 & 6 & 4 & 6 & 3 & 7 & 3 & 12 & 4 & 9 & 3 & 4 & 5 & 4 \\ 9 & 7 & 8 & 4 & 3 & 1 & 5 & 4 & 3 & 4 & 4 & 8 & 10 & 0 & 6 & 5 & 5 & 8 & 1 & 5 \\ 2 & 5 & 7 & 6 & 4 & 4 & 6 & 7 & 10 & 6 & 5 & 5 & 1 & 5 & 2 & 4 & 5 & 5 & 7 & 4 \\ 6 & 6 & 3 & 4 & 9 & 7 & 5 & 7 & 2 & 5 & 4 & 4 & 6 & 5 & 5 & 4 & 3 & 6 & 4 & 5 \\ 4 & 4 & 2 & 2 & 6 & 5 & 3 & 6 & 8 & 4 & 3 & 8 & 3 & 7 & 9 & 7 & 4 & 3 & 10 & 2 \\ 1 & 8 & 2 & 3 & 4 & 6 & 3 & 2 & 7 & 7 & 6 & 6 & 6 & 5 & 1 & 6 & 7 & 3 & 10 & 7 \\ 5 & 6 & 7 & 4 & 8 & 3 & 1 & 3 & 10 & 2 & 7 & 3 & 4 & 4 & 9 & 5 & 5 & 7 & 2 & 5 \\ 4 & 6 & 6 & 5 & 5 & 2 & 4 & 3 & 6 & 7 & 2 & 3 & 6 & 8 & 7 & 6 & 8 & 5 & 5 & 2 \\ 5 & 5 & 5 & 4 & 4 & 5 & 5 & 16 & 4 & 3 & 3 & 3 & 7 & 1 & 8 & 4 & 5 & 7 & 5 & 1 \\ 2 & 5 & 3 & 5 & 6 & 2 & 8 & 3 & 1 & 6 & 5 & 9 & 3 & 3 & 8 & 5 & 6 & 6 & 7 & 7 \\ 8 & 3 & 1 & 6 & 3 & 4 & 4 & 2 & 5 & 2 & 5 & 6 & 2 & 9 & 8 & 5 & 7 & 3 & 5 & 12 \\ 3 & 8 & 6 & 6 & 6 & 4 & 6 & 6 & 1 & 3 & 10 & 6 & 4 & 8 & 3 & 2 & 6 & 4 & 4 & 4 \\ 4 & 3 & 6 & 7 & 4 & 9 & 7 & 3 & 3 & 6 & 8 & 5 & 2 & 7 & 2 & 4 & 4 & 6 & 6 & 4 \\ 2 & 5 & 7 & 7 & 7 & 6 & 4 & 6 & 4 & 6 & 4 & 5 & 5 & 4 & 4 & 4 & 2 & 6 & 5 & 7 \\ 10 & 4 & 4 & 6 & 4 & 3 & 7 & 2 & 4 & 1 & 7 & 4 & 8 & 4 & 9 & 6 & 5 & 3 & 6 & 3 \\ 5 & 7 & 4 & 4 & 4 & 8 & 4 & 5 & 5 & 6 & 7 & 6 & 6 & 6 & 2 & 4 & 6 & 3 & 3 & 5 \\ 2 & 2 & 6 & 5 & 3 & 11 & 5 & 4 & 6 & 9 & 6 & 4 & 10 & 3 & 3 & 4 & 4 & 2 & 4 & 7 \end{pmatrix}$$

The purpose of the algorithm is to assign a band of color connecting row i to column j, for which that color band is used in row i to connect to column j and no other columns, and used in column j to connect to row i and no other rows. We are assuming we have 100 colors for making all of the required connections. Note that in the above table, the number of connections in each row equals 100 and the number of connections in each column equals 100.

The output will be the entire color assignment for each row and column. Each total color band for a column is the sum of the requirements for that column, and likewise for rows. The color band for a column matches the color band for the row which crosses it, with width of that band being the connectivity requirement. The color band connecting a row to a column is unique in the row for that column, and unique in the column for that row.

The algorithm works by assigning a color band to each of the rows and columns at the same time. This prevents difficulties associated with trying to find free colors in a (row, column) pair, as each time the process occurs it is known that the colors are free. The difficulty added, however, is that now (row, column) pairs must be found, with each row and each column represented exactly once, and such that the connectivity requirement between all of these pairs is large enough to assign a color bandwidth to. The same bandwidth is assigned to each of the pairs. Most of the pairs will still have a remaining bandwidth requirement which still needs to be filled, and will be done so with color bands assigned later.

The difficult part of the algorithm is finding the set of (row, column) pairs, such that the minimum remaining connectivity requirement (after previous colors have been assigned) is as large as reasonably possible. That way, when the color band is assigned to those pairs, little or no bandwidth is wasted.

The algorithm that finds the (row, column) pairs is called "findrowcolpairs". It uses a so-called greedy algorithm which uses a weighting function to find a best (row, column) pair, save that pair, and then remove that row and column from consideration for the future pairs. The weighting function can take a variety of forms, but we have heuristically found a weighting function that seems to work particularly well.

The algorithm occasionally will find a poor solution where one of the (row, column) pairs has a small remaining connectivity requirement. This can cause 'sticking' if the pairing is continually attempted. In order to prevent sticking of the algorithm, we have found that the addition of a small amount of noise into the findrowcolpairs algorithm is beneficial. The noise level is small enough so that good choices are still made initially, but that small amount of noise allows the algorithm to take different attempts when one of these sticking conditions is encountered.

The following are the routines:
These routines were implemented in MathCad.
The first routine is the heuristic weighting function routine. It divides the connectivity requirement by the row and column total requirements. This makes pairs which dominate their row and column particularly heavily weighted:

$$weightingfunction(M) := \begin{vmatrix} \text{for } i \in 0 \ldots \text{rows}(M)-1 \\ \quad C_i \leftarrow \sum M^{(i)} \\ \quad R_i \leftarrow \sum (M^T)^{(i)} \\ RC \leftarrow R \cdot C^T \\ \overrightarrow{RC \leftarrow [RC+(RC=0)]} \\ \overrightarrow{\dfrac{M}{RC}} \end{vmatrix}$$

The next routine just removes the row and column from consideration by setting them equal to zero. This is done after the row and column are added to the list:

$$remove(M, r, c) := \begin{vmatrix} M^{(c)} \leftarrow M^{(c)} \cdot 0 \\ Mt \leftarrow M^T \\ Mt^{(r)} \leftarrow Mt^{(r)} \cdot 0 \\ M \leftarrow Mt^T \\ M \end{vmatrix}$$

The next routine finds the row and column pairs. It uses the weighting function to pick the best pair, adds it to the list, removes it from consideration, then repeats the process until all pairs are defined:

$$findrowcolpairs(M) := \begin{vmatrix} \text{for } n \in 0 \ldots \text{rows}(M)-1 \\ \quad Q \leftarrow weightingfunction(M) \\ \quad maxQ \leftarrow match(max(Q), Q)_0 \\ \quad Loc^{(n)} \leftarrow maxQ \\ \quad M \leftarrow remove(M, maxQ_0, maxQ_1) \\ Loc \end{vmatrix}$$

The next routine produces an array of random numbers, used as noise to prevent sticking:

$$noisemat(sig, n) := \begin{vmatrix} \text{for } i \in 0 \ldots n-1 \\ \quad M^{(i)} \leftarrow rnorm(n, 0, sig) \\ M \end{vmatrix}$$

The main routine:
Inputs are the connectivity requirements matrix; output is a list of remaining connectivity at each step, the list of bands assigned, and the pairs associated with those bands. It uses findrowcolpairs to pick the pairings for each step, with some noise added to prevent sticking, finds the minimum connectivity for those pairs and assigns that value to bandwidth, removes that bandwidth from the pairs' connectivity requirement, records the assignments, and repeats until done.

$$magicmatrix(A, iter) := \begin{vmatrix} band_0 \leftarrow 0 \\ pair \leftarrow 0 \\ \text{for } n \in 0 \ldots iter \\ \quad Loc \leftarrow findrowcolpairs \\ \quad (A + noisemat(0.5, \text{rows}(A))) \\ \quad \text{for } i \in 0 \ldots \text{rows}(A)-1 \\ \quad\quad vals_i \leftarrow A_{Loc_{0,i}, Loc_{1,i}} \\ \quad bandwidth \leftarrow \min(vals) \\ \quad \text{for } i \in 0 \ldots \text{rows}(A)-1 \\ \quad\quad A_{Loc_{0,i}, Loc_{1,i}} \leftarrow vals_i - bandwidth \\ \quad residual_n \leftarrow \text{mean}(A) \\ \quad\quad band \leftarrow stack \\ \quad (band, band_{last(band)} + bandwidth) \\ \quad pair \leftarrow if(pair \neq 0, stack \\ \quad (pair, Loc), Loc) \\ \begin{pmatrix} residual \\ band \\ pair \end{pmatrix} \end{vmatrix}$$

Figures 13, 14, 15:
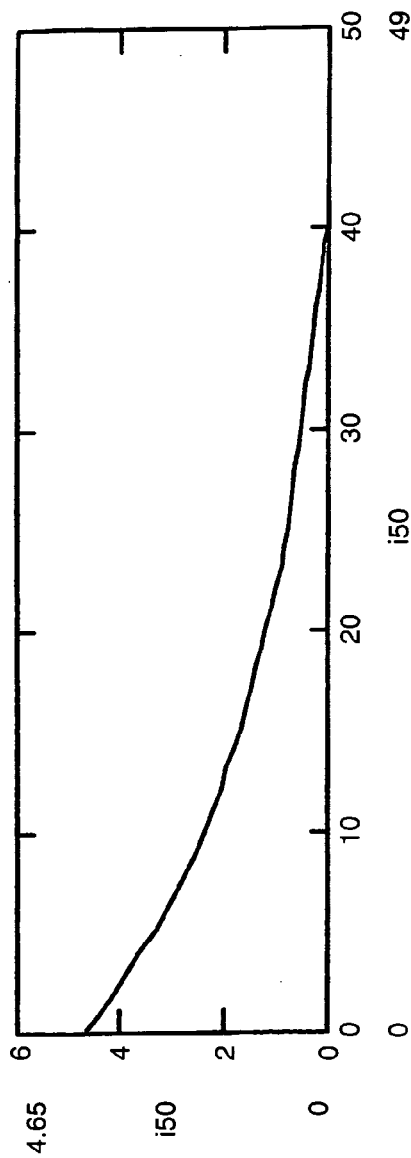
FIGS. 13, 14 and 15 show results of the use of a Magic Square Algorithm for determining appropriate non-blocking connectivity among area code nodes.

Run algorithm, 50 iterations, with the matrix listed above:
assignments :=magicmatrix(A,50)
Plot of residual, should become zero as shown in FIG. 14.
The bandwidth assignments and pairing for those assignments are shown in FIG. 17.

For example, the first band is frequencies 0-3. In this band, row 0 connects to column 0, row 4 connects to column 1, etc. In the second band (4-8), row 1 connects to column 0, row 0 connects to column 1, etc. The next band is 9-10, followed by 11-13, etc. Notice that there are a total of 40 bands definitions required, defining a total of 100 different colors.

The graph of FIG. 14 shows the residual as a function of iteration number, which becomes zero (finished) at the 39$^{th}$ iteration. This performance is quite good considering that 100 colors are being assigned in those 39 iterations.

Each of the 20×20 squares is now divided into zero to fifteen colors (depending on the required number of colors from the R-matrix), with each of 100 colors represented as indicated in FIG. 15. Each of these 100 colors appears exactly once in each row and column.

The algorithm runs in polynomial time (this means that the number of operations scales as a power of the number of inputs). This is very significant, as the number of arrangements a color can take is the number of permutations of the inputs to the outputs, which is N!. This is clearly much too large to sift through, and algorithm intelligence is required to make smart selections without trying every case. The algorithm computational speed is fast enough to service a kilohertz re-provisioning rate.

The algorithm has been tested 50 times. It converged every time in roughly 40 iterations. 5 of those times, however, the algorithm "stalled". When this occurred, the matrix was transposed, and the algorithm converged without a problem.

Our hypothesis on the behavior of the algorithm is that it starts a bad permutation approximately 10% of the time as it approaches the end. This sticking seems to behave randomly, so apparently any permutation or transposition gives the algorithm another 90% chance to succeed. So far the there has never been a case that needed more than a single transpose.

Example

Figure 16:
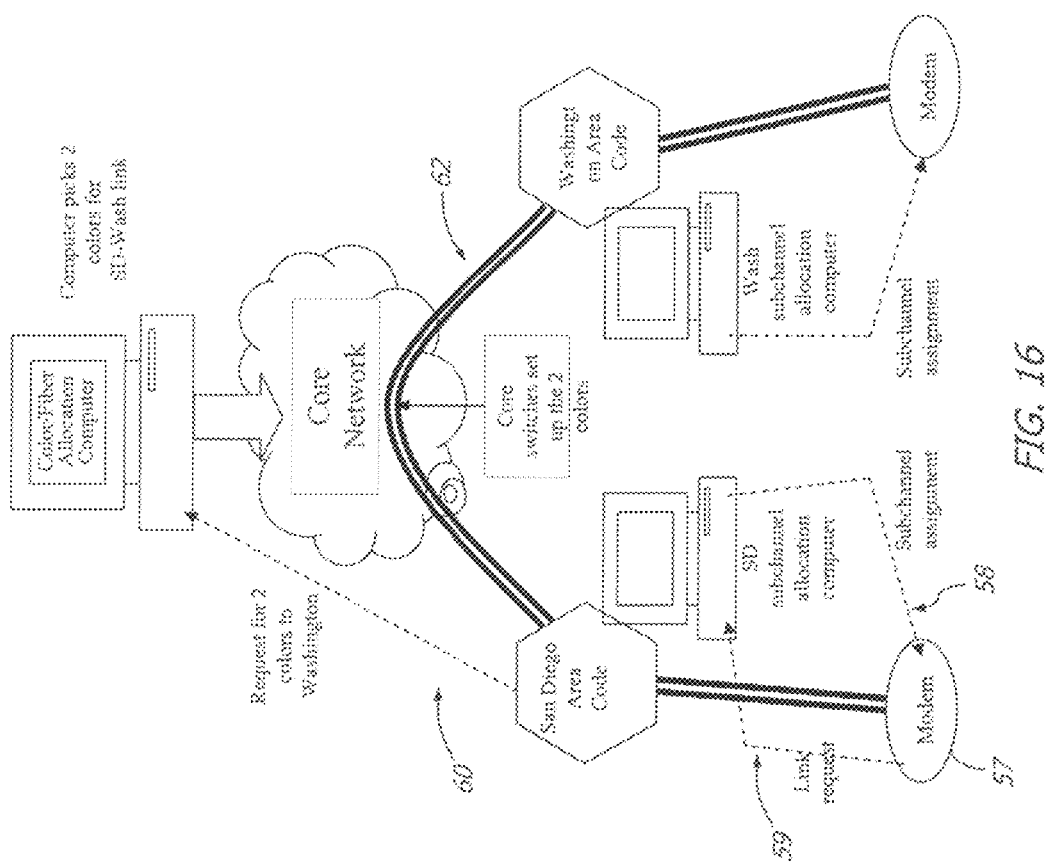
FIG. 16 shows an example of communication with a preferred embodiment of the present invention.

By reference to FIG. 16, the following is an example communication using the network described above.

The caller in San Diego is connected electrically to a local modem 57, sends a request to the modem for a link to Washington as shown at 59. The modem forwards this request to the San Diego area code computer to receive a sub-channel on one of the FiberColors assigned to Washington. Here, 2 FiberColors have already been given to the San Diego to Washington connection due to the recent traffic requirements. The San Diego computer picks an available frequency range for the sub-channel, and informs the modem at 58, the Washington computer, and the appropriate modem in Washington. The modems then have a direct link and data can be transferred. The Washington modem electrically sends the data to the called party nearby.

Before this happened, due to demands, San Diego had requested from the core allocation computer 2 FiberColors for the link to Washington as shown at 62. The core computer picked the two FiberColors and the link path using the Magic algorithm and other network allocation software. It then instructed the core switches to set up the link. As conditions change, the FiberColors will be reallocated on a sub-second time scale, and the number of FiberColors may go up or down as demands increase or drop.

While the present invention was described in terms of specific embodiment, the reader should understand that many changes and modifications could be made within the general spirit of the invention. For example, the number of area code nodes might be smaller or larger than 250 and the number of frequencies could be less or more than 300, a small system might have only 20 area code nodes and use only 100 wavelengths as in the specific example given demonstrating the magic square software. If the need exists two or more of these systems could operate in competition in a single region. Small systems could be established specifically to support massively parallel computational platforms. Therefore the scope of the invention should be obtained by the appended claims.

We claim:

1. A large optically switched communication network comprising:
    (A) a plurality of more than 20 area code nodes;
    (B) a network of optical fibers;
    (C) a plurality of dense wavelength division multiplexing components for providing at least 100 wavelength communication channels through each optical fiber in said network of optical fibers;
    (D) a plurality of processor controlled optical switches located at each of said area code nodes;
    (E) a plurality of electro-optical modulators to modulate user data onto said network of optical fibers at wavelengths within selected wavelength communication channels;
    (F) a plurality of processors, said plurality of processors being programmed with a magic square routing algorithm for controlling said optical switches to permit a plurality of single wavelength communication links through said network of optical fibers from each of said plurality of area code nodes to every other one of said area code nodes; and
    (G) at least one optical signal generator for generating a plurality of narrow band optical reference frequency signals and a plurality of optical sub-frequency signals, said optical sub-frequency signals defining each of said at least 100 wavelength communication channels;
wherein each communication link in each of said communication channels from each area code node to every other area code node within the network is routed without a change in wavelength and without optical-electrical optical conversion; and
wherein said magic square routing algorithm is an algorithm adapted to utilize a requirements matrix and an allocation matrix in order to permit assignments of wavelength communication channels on a sub-second time scale.

2. The network as in claim 1 wherein said at least 100 wavelength communication channels is at least 300 wavelength communication channels.

3. The large optically switched communication network as in claim 1 and further comprising a plurality of narrowband tunable filters located at the area code nodes to isolate selected wavelength communication channels from other wavelength communication channels.

4. The large optically switched communication network as in claim 1 and also comprising a plurality of detectors located at said area code nodes adapted to extract user data by interfering filtered data fiber signals with filtered reference fiber signals.

5. The large optically switched communication network as in claim 1 wherein each of said at least 100 wavelength communication channels is adapted to provide up to 4 GHz of bandwidth for carrying user data.

6. The large optically switched communication network as in claim 5 wherein said up to 4 GHz of bandwidth is about 2.4 GHz of bandwidth.

7. The large optically switched communication network as in claim 1 wherein said network is adapted to provide between 10 and 100 MHz of bandwidth for each individual user.

8. The large optically switched communication network as in claim 1 wherein said network is adapted to provide about 25 MHz of bandwidth for each individual user.

9. The large optically switched communication network as in claim 1 wherein said plurality of narrowband optical reference frequency signals are at a standard dense wavelength division multiplexing frequency spacing of 50 GHz.

10. The large optically switched communication network as in claim 9 wherein each of said plurality of narrowband optical reference frequency signals is associated with seven optical sub-frequency signals defining six wavelength communication channels.

11. The large optically switched communication network as in claim 10 wherein said seven optical sub-frequency signals are at a frequency spacing of about 4 GHz.

12. The large optically switched communication network as in claim 1 wherein said plurality of more than 20 area codes is a plurality of at least 250 area codes.

13. The large optically switched communication network as in claim 1 wherein said plurality of more than 100 wavelength communication channels is a plurality of more than 300 wavelength communication channels.

14. The large optically switched communication network as in claim 1 wherein at least a portion of said user data is carried over coaxial cable between users and an electro-optic modulator associated with said area code nodes.

15. The large optically switched communication network as in claim 1 wherein at least a portion of said user data is carried between users and an electro-optic modulator associated with said area code nodes on communication links separate from the network.

16. The large optically switched communication network as in claim 15 wherein the communication links separate from the network are communication links chosen from the following group of communication links:
  optical cable,
  coaxial cable,
  twisted pairs,
  free-space radio, and
  free-space optical.

* * * * *